3,361,729
POLYPROPYLENE COMPOSITION
Naoichi Takashima, Hajima-gun, and Toshihiko Kuroda, Goro Nishiyama, and Yasuhiko Higuchi, Yokkaichi-shi, Japan, assignors to Mitsubishi Petrochemical Company Limited, Tokyo, Japan, a corporation of Japan
No Drawing. Filed June 2, 1964, Ser. No. 372,105
Claims priority, application Japan, June 7, 1963, 38/29,248
4 Claims. (Cl. 260—93.7)

ABSTRACT OF THE DISCLOSURE

A polypropylene composition having incorporated therein a complex which is the resultant of a reaction between an organic acid, such as phthalic acid, and an aluminum organic or inorganic compound, such as alumina as a sample inorganic compound and aluminum acetate as a sample organic compound.

---

This invention relates to polypropylene compositions high in transparency and luster.

It is so difficult to control the polymerization degree of polypropylene due to the characteristics of its polymerization process that a product of a comparatively high degree of polymerization is apt to be obtained. Therefore, the melt viscosity will become so high that the product will be hard to homogenize in the normal method, the forming of crystals in molding will be irregular, the transparency of the molding will reduce and the clearness when a coloring agent is added will be lower.

We inventors have already discovered a method of improving the transparency of films and other moldings of a polypropylene by adding about 0.01 to 2% of a carboxylic acid or its anhydride to the polypropylene. On the other hand, we have also discovered that, in the case of improving the properties of a polypropylene by adding such additive, the effect of the addition will considerably vary depending on the sample irrespectively of the intrinsic viscosity ($\eta$), isotactic index (II) and melt index (MI) of the polypropylene.

As a result of various researches made by nothing that such undesirable fluctuations are caused by the uncontrollable fluctuation and by the reactivity of a slight amount of the catalyst components inevitable introduced at the polymerizing step into the polypropylene polymerized by a so-called Ziegler-Natta catalyst, we have discovered that, by using about 0.01 to 2% (preferably 0.05 to 0.3%) by weight of an aluminum compound, together with the carboxylic acid or its anhydride, the effects of the addition of said carboxylic acid or its anhydride, that is, the effects of improving the moldability of the polypropylene and the transparency, homogeneity and luster of the molding will be more remarkably promoted and at the same time the dependency of the effect of the addition on the sample will be able to be eliminated.

That is to say, the present invention is a polypropylene composition composed of a polypropylene, 0.01 to 2% by weight of at least one compound selected from a group consisting of saturated aliphatic dicarboxylic acids, their anhydrides of the general formula HOOC(CH$_2$)$_n$COOH wherein $8 \geq n \geq 2$, ortho-aromatic dicarboxylic acids and their anhydrides and alkylated aromatic monocarboxylic acids of the general formula C$_n$H$_{2n+1}$—C$_6$H$_4$COOH wherein $12 \geq n \geq 0$ and 0.01 to 2% by weight of at least one compound selected from a group consisting of inorganic and organic aluminum compounds (including their anhydrides) of the general formulas Al(OR)$_3$ and Al(OOCR)$_3$ wherein R is hydrogen or a substituted or unsubstituted alkyl, cycloalkyl, aryl, alkalyl or alalkyl radical.

With a compound in which, in the above mentioned general formula of the aliphatic dicarboxylic acids, $n$ is 9 or larger, the effect will reduce. Similarly lower malonic acid and oxalic acid are also not favorable. Further, the alkylated aromatic monocarboxylic acid in which the number of carbon atoms of the alkyl radical exceeds 12 is also low in the effect.

Such additives can be easily mixed with a polypropylene powder by such conventional method as, a Nauta mixer or ribbon blender. Also, as in the normal method, they can be mixed by using an extruder, heat roll or Banbury mixer.

The aluminum compound will give new compound by forming a complex with the carboxylic acid or its anhydride in the polypropylene. The formation of this compound will accelerate the nucleus forming ability of the carboxylic acid or its anhydride and thus will improve furthermore the transparency of the polypropylene molding. Further, as the nucleus forming ability is accelerated, the time of crystallization in the step of cooling the melt can be shortened much less than in the case of using the carboxylic acid or its anhydride alone. Therefore, the quicker and more uniform growth of crystals will become possible and the mechanical strength will increase.

With the addition of the above mentioned aluminum compound alone, such improvements in the transparency and others as are described above will not be obtained.

Instead of the above mentioned process wherein the said aluminum compound and the carboxylic acid or its anhydride are mixed in the polypropylene so as to react for forming a nucleus formation accelerator, the process wherein the carboxylic acid or its anhydride and the aluminum compound are previously mixed and heated at 150 to 250° C. so as to react with each other and the reaction product is added to the polypropylene, can be also adopted.

According to the present invention, as described above, films and other moldings of a polypropylene resin high in transparency and mechanical properties can be produced by adding the aluminum compound as a nucleus formation accelerator to a carboxylic acid or its anhydride as a nucleus forming agent in a polypropylene resin and melting and working the composition.

The working process may be either of the generally used injection molding and extrusion molding. The product can be used for general moldings; blow moldings, vacuum moldings, inflation films, T-die films and the like.

The present invention shall be explained more concretely with reference to the following examples in which the haze was measured according to JIS K6717.

Example 1

Three samples were prepared by adding respectively 0.05 g., 0.25 g. and 0.5 g. of alumina to 500 g. of a polypropylene powder of the intrinsic viscosity ($\eta$) of 1.8 in tetralin at 130° C. and isotactic index (II) of 97% containing 1.5 g. of phthalic anhydride. Each sample was mixed by means of a Nauta mixer, and was extruded by an extruder of a diameter of 20 mm. (set at 230° C.) to the pellets. Thereafter, a sheet of 0.5 mm. was made of the pellets with a press at 190° C. and was tested.

Further there were prepared another four test pieces containing respectively 1.5 g. of phthalic anhydride, 0.5 g. or 1.5 g. of alumina and containing none of such additions pelletized and pressed by the same method as is mentioned above. Each sample was tested in the same manner. The comparison of the results is shown in Table 1 wherein the same stabilizer was normally mixed in each sample.

As evident from Table 1, in case only alumina was used, there was no effect at all but, when it was used together with phthalic anhydride, the haze was reduced remarkably and the transparency was improved.

TABLE 1

| Sample No. | Additives | | Haze in Percent |
|---|---|---|---|
| | Phthalic anhydride in g. | Alumina in g. | |
| 1 | | | 72 |
| 2 | 1.5 | | 53 |
| 3 | | 0.5 | 72 |
| 4 | | 1.5 | 74 |
| 5 | 1.5 | 0.05 | 40 |
| 6 | 1.5 | 0.25 | 37 |
| 7 | 1.5 | 0.5 | 32 |

*Example 2*

Samples were prepared by adding respectively 0.25 g. of each of alumina, aluminum hydroxide, aluminum phosphate, aluminum acetate, aluminum isopropoxide and aluminum butoxide to 500 g. of a polypropylene powder of an intrinsic viscosity ($\eta$) of 23 in tetralin at 130° C. and an isotactic index (II) of 98% containing 1.5 g. of phthalic anhydride and were tested in the same manner as in Example 1. The results are shown in Table 2 comparing with the results of the tests of samples prepared by the same method as is mentioned above containing only phthalic anhydride and by adding none of such additives.

TABLE 2

| Sample No. | Additives | | Haze in Percent |
|---|---|---|---|
| | 1.5 g. of phthalic anhydride | 0.25 g. of aluminum compound | |
| 1 | | | 72 |
| 2 | Added | | 57 |
| 3 | do | Alumina | 35 |
| 4 | do | Aluminum hydroxide | 38 |
| 5 | do | Aluminum phosphate | 39 |
| 6 | do | Aluminum acetate | 28 |
| 7 | do | Aluminum isopropoxide | 37 |
| 8 | do | Aluminum butoxide | 35 |

*Example 3*

Samples were prepared with polypropylene polymerized using the catalyst consisted of aluminum diethyl monochloride and titanium trichloride and having the characteristics shown in Table 3 by adding respectively 1.5 g. phthalic anhydride, both of 1.5 g. of phthalic anhydride and 0.25 g. of alumina or by adding none of said additives.

The results of each test carried out in the same manner as in Example 1 are shown in Table 3.

TABLE 3

| Sample No. | ($\eta$) | II | Total ash in percent | Haze in percent | | |
|---|---|---|---|---|---|---|
| | | | | Not added | Phthalic anhydride added | Both added |
| 1 | 1.9 | 95.2 | 0.01 | 70 | 55 | 36 |
| 2 | 2.3 | 97.5 | 0.01 | 72 | 38 | 33 |
| 3 | 2.1 | 96.0 | 0.01 | 68 | 35 | 30 |
| 4 | 1.8 | 95.3 | 0.01 | 70 | 40 | 32 |
| 5 | 1.6 | 95.0 | 0.01 | 71 | 43 | 31 |

*Example 4*

There were samples prepared by adding respectively 0.1% by weight of each of succinic acid, p-toluic acid, o-phthalic acid and p-ter-butyl benzoic acid to a polypropylene powder having a melt index of 20 and samples by adding both of 0.1% of the above mentioned carboxylic acid and 0.1% aluminum acetate. They were tested in the same manner as in Example 1. The results are shown in Table 4.

TABLE 4

| Sample No. | Additives | | Haze in percent |
|---|---|---|---|
| | 0.1% carboxylic acid | 0.1% aluminum compound | |
| 1 | | | 70 |
| 2 | Succinic acid | | 46 |
| 3 | do | Aluminum acetate | 37 |
| 4 | p-Toluic acid | | 52 |
| 5 | do | Aluminum acetate | 39 |
| 6 | o-Phthalic acid | | 54 |
| 7 | do | Aluminum acetate | 40 |
| 8 | p-Ter-butyl benzoic acid | | 43 |
| 9 | do | Aluminum acetate | 33 |

*Example 5*

Each of the same samples as were used in Example 2 was melted at 200° C. for 20 minutes and was then left standing at 137° C. The reduction of the specific volume in accordance with time caused by the crystallization of the melt was measured. The crystallizing velocity was determined with $\tau\frac{1}{2}$; the time required for the reduction of specific volume to reach half of the value of the saturated value. The results are shown in Table 5.

TABLE 5

| Sample No. | Additives | $\tau\frac{1}{2}$ |
|---|---|---|
| 1 | 1.5 g. of phthalic anhydride | 24 |
| 2 | 1.5 g. of phthalic anhydride+0.25 g. of aluminum acetate | 12 |
| 3 | 1.5 g. of phthalic anhydride+0.25 g. of aluminum phosphate | 10.5 |

*Example 6*

Each sample containing 0.05% by weight phthalic anhydride and 0.01% by weight alumina, aluminum hydroxide, aluminum phosphate or aluminum acetate in polypropylene of an intrinsic viscosity ($\eta$) of 1.7 in tetralin at 130° C. and an isotactic index (II) of 95% was prepared and was mixed by means of a dry blender.

After preparation of compound by passing mixture through extruder set at 220° C., an inflation film 0.02 mm. thick was blown at a molding temperature of 230° C., blow ratio of 1.5, frost line of 200 mm. height and extruding velocity of 6 kg./hr. Table 6 shows the results of the test of such films comparing with those of films molded respectively from a sample containing only 0.05% phthalic anhydride and a sample containing none of phthalic anhydride and an aluminum compound under the same molding conditions as are mentioned above.

TABLE 6

| Sample No. | Additives | Haze in percent | Luster in percent | Stripe produced |
|---|---|---|---|---|
| 1 | None | 42.5 | 23.5 | Many. |
| 2 | 0.05% (P) phthalic anhydride | 6.6 | 67.0 | None. |
| 3 | (P)+0.01% alumina | 5.0 | 69.0 | Do. |
| 4 | (P)+0.01% alumina hydroxide | 4.9 | 66.1 | Do. |
| 5 | (P)+0.01% aluminum phosphate | 4.7 | 64.9 | Do. |
| 6 | (P)+0.01% aluminum acetate | 5.2 | 70.2 | Do. |

*Example 7*

With the same samples as were prepared in Example 2 small boxes were molded by injection at a cylinder temperature of 260° C., pressure of 1.320 kg./cm.² and die temperature of 40° C. The comparing data of the surface luster and the haze of small pieces of these small boxes with those of small boxes molded respectively of a sample having no additive, a sample prepared by adding only 0.3% phthalic anhydride and a sample prepared by adding 0.3% phthalic anhydride and 0.05% aluminum acetate are as in Table 7.

TABLE 7

| Sample No. | Additives | Surface luster | Haze in percent |
|---|---|---|---|
| 1 | None | Small | 80 |
| 2 | 0.3% phthalic anhydride | Medium | 62 |
| 3 | 0.3% phthalic anhydride and 0.05% aluminum acetate. | Large | 56 |

As shown in the above examples, when a small amount of said aluminum compounds are added to polypropylene together with carboxylic acid or anhydride thereof, the transparency and the luster of the moldings and the fluctuation of the effect of addition of nucleus forming agent depending on uncontrollable difference of polymer are much more improved than in case of single addition of carboxylic acid or anhydride thereof showing the synergism of aluminum compound and carboxylic acid or anhydride, and yet the workability in molding and the mechanical characteristics of the moldings will not be impaired.

Further, two or more of such aluminum compounds may be simultaneously used and can be used as mixed with any other additive.

The polypropylenes to be improved by the present invention include an isotactic polypropylene, a polypropylene mixture prepared by mixing 0.1 to 50% of additives, a copolymer containing propylene as a principal constituent and such copolymer mixed with other additives.

What we claim is:

1. A polypropylene composition comprising polypropylene and a complex, said complex being the resultant of the reaction between 0.01 to 2% by weight of at least one acid as a reactant selected from the group consisting of saturated aliphatic dicarboxylic acids and their anhydrides having the general formula:

$$HOOC(CH_2)_nCOOH$$

wherein $8 \geq m \geq 2$, ortho-aromatic dicarboxylic acids and their anhydrides, and alkylated aromatic monocarboxylic acids of the general formula: $C_nH_{2n+1}-C_6H_4COOH$ wherein $12 \geq n \geq 0$ and as the other reactant 0.01 to 2% by weight of at least one aluminum compound selected from the group consisting of inorganic aluminum compounds and organic aluminum compounds selected from the group consisting of $Al(OR)_3$ and $Al(OOCR)_3$ wherein R is hydrogen, alkyl, cycloalkyl, and aryl radicals.

2. A polypropylene composition of claim 1 wherein the carboxylic acid is selected from the group consisting of phthalic acid, phthalic anhydride, succinic acid, p-toluic acid and p-terbutyl benzoic acid and the aluminum compound is selected from the group consisting of alumina, aluminum hydroxide, aluminum phosphate, aluminum acetate, aluminum isopropoxide and aluminum butoxide.

3. A polypropylene of claim 1 wherein the carboxylic acid is selected from the group consisting of phthalic acid, phthalic anhydride, succinic acid, p-toluic acid and p-ter-butyl benzoic acid.

4. A polypropylene of claim 1 wherein the aluminum compound is selected from the group consisting of alumina, aluminum hydroxide, aluminum phosphate, aluminum acetate, aluminum isopropoxide and aluminum butoxide.

References Cited

UNITED STATES PATENTS 3,226,351    12/1965    Weber et al. _____ 260—94.9

JOSEPH L. SCHOFER, *Primary Examiner.*

L. EDELMAN, *Assistant Examiner.*